United States Patent
De Malsche et al.

(10) Patent No.: US 11,491,458 B2
(45) Date of Patent: Nov. 8, 2022

(54) METHOD FOR PRODUCING CHEMICAL REACTOR

(71) Applicant: PHARMAFLUIDICS NV, Ghent (BE)

(72) Inventors: Wim De Malsche, Berchem (BE); Jeff Op De Beeck, Mariakerke (BE); Paul Jacobs, Lokeren (BE); Bo Claerebout, Kortrijk (BE)

(73) Assignee: PHARMAFLUIDICS NV, Ghent (BE)

( * ) Notice: Subject to any disclaimer, the term of this patent is extended or adjusted under 35 U.S.C. 154(b) by 248 days.

(21) Appl. No.: 16/644,272

(22) PCT Filed: Sep. 4, 2018

(86) PCT No.: PCT/EP2018/073789
§ 371 (c)(1),
(2) Date: Mar. 4, 2020

(87) PCT Pub. No.: WO2019/043270
PCT Pub. Date: Mar. 7, 2019

(65) Prior Publication Data
US 2021/0023527 A1    Jan. 28, 2021

(30) Foreign Application Priority Data
Sep. 4, 2017   (BE) .................... 2017/5619

(51) Int. Cl.
*B01J 20/10* (2006.01)
*B01J 19/00* (2006.01)
*B01J 20/28* (2006.01)
*B01J 20/282* (2006.01)
*B01J 20/30* (2006.01)

(52) U.S. Cl.
CPC ........... *B01J 20/10* (2013.01); *B01J 19/0093* (2013.01); *B01J 20/282* (2013.01); *B01J 20/28028* (2013.01); *B01J 20/3085* (2013.01); *B01J 2219/00846* (2013.01); *B01J 2220/54* (2013.01); *B01J 2220/82* (2013.01)

(58) Field of Classification Search
CPC .. B01J 20/10; B01J 19/0093; B01J 20/28028; B01J 20/282; B01J 20/3085; B01J 2219/00846; B01J 2220/54; B01J 2220/82
USPC .......................................................... 502/5
See application file for complete search history.

(56) References Cited

U.S. PATENT DOCUMENTS

| | | | |
|---|---|---|---|
| 4,207,188 A | 6/1980 | Tsuda et al. |
| 5,134,110 A | 7/1992 | Sudo et al. |
| 7,586,091 B2 | 9/2009 | Takahashi et al. |
| 9,482,651 B2 | 11/2016 | Piechotta et al. |
| 9,636,675 B2 | 5/2017 | Astier et al. |
| 9,868,119 B2 | 1/2018 | Astier et al. |
| 10,393,642 B2 | 8/2019 | Astier et al. |
| 2006/0214101 A1 | 9/2006 | Takahashi et al. |
| 2008/0182918 A1 | 7/2008 | Chuda et al. |
| 2010/0032357 A1 | 2/2010 | Kiyomoto et al. |
| 2011/0132196 A1 | 6/2011 | Suzuki et al. |
| 2012/0273350 A1 | 11/2012 | Piechotta et al. |
| 2015/0299409 A1 | 10/2015 | Brede |
| 2016/0144361 A1 | 5/2016 | Astier et al. |
| 2016/0146717 A1 | 5/2016 | Astier et al. |
| 2017/0205329 A1 | 7/2017 | Astier et al. |

FOREIGN PATENT DOCUMENTS

| | | |
|---|---|---|
| CN | 1774626 A | 5/2006 |
| CN | 101171075 A | 4/2008 |
| CN | 103776940 A | 5/2014 |
| CN | 104902993 A | 9/2015 |
| JP | H04250625 A | 9/1992 |
| JP | 2005000744 A | 1/2005 |
| JP | 2005066382 A | 3/2005 |
| JP | 2005144822 A | 6/2005 |
| JP | 2008045966 A | 2/2008 |
| JP | 2011141271 A | 7/2011 |
| JP | 2013510290 A | 3/2013 |
| JP | 2013255912 A | 12/2013 |
| JP | 2018506264 A | 3/2018 |
| WO | 0146458 A1 | 6/2001 |
| WO | 2004081555 A1 | 9/2004 |

OTHER PUBLICATIONS

Chinese Office Action from corresponding CN Application No. EP18198990, dated Jun. 28, 2021.
Japanese Office Action from Corresponding JP Application No. 2020-513332, dated Mar. 31, 2022.
Anderson et al., "Chemical Surface Modification of Porous Silicon," Journal of Electrochemical Society, Inc., vol. 140, No. 5, May 1993, pp. 1393-1396.
De Pra et al., "Pillar-Structured Microchannels for On-Chip Liquid Chromatography: Evaluation of the Permeability and Separation Performance," Journal of Separation Science, vol. 30, 2007, pp. 1453-1460.
Detobel et al., "Fabrication and Chromatographic Performance of Porous-Shell Pillar-Array Columns," Analytical Chemistry, vol. 82, No. 17, Sep. 1, 2010, pp. 7208-7217.

(Continued)

*Primary Examiner* — Edward M Johnson
(74) *Attorney, Agent, or Firm* — Workman Nydegger (57) ABSTRACT

A method for producing a chemical reactor device based on a fluid flow comprises obtaining a substrate with a fluid channel defined by a channel wall, in which an ordered set of silicon pillar structures is positioned in the fluid channel and electrochemically anodising at least the silicon pillar structures to make the silicon pillar structures porous at least to a certain depth. After the anodising, the substrate and pillar structures are thermally treated, the treatment being carried out at a temperature, with a duration and in an atmosphere such that any silicon oxide layer formed has a thickness of less than 20 nm. The substrate and the pillar structures are further functionalized.

13 Claims, 6 Drawing Sheets

(56) References Cited

OTHER PUBLICATIONS

Sukas et al., "Fabrication of Integrated Porous Glass for Microfluidic Applications," Lap Chip, vol. 13, 2013, pp. 3061-3069.
Belgian Search Report and Written Opinion from BE Application No. BE201705619, dated May 18, 2018.
International Search Report and Written Opinion from PCT Application No. PCT/EP2018/073789, dated Dec. 21, 2018.
Chinese Office Action in corresponding Chinese Patent Application No. 201880069579.3, dated Jun. 10, 2022.

METHOD FOR PRODUCING CHEMICAL REACTOR

FIELD OF THE INVENTION

The present invention generally relates to chemical reactors such as, for example, chromatographic systems. More specifically, the present invention relates to production techniques for chemical reactors as well as to the resulting chemical reactors, which comprise porous, microfabricated pillar structures.

BACKGROUND TO THE INVENTION

Systems that utilise liquid propagation have a large number of applications, including chemical component production, nanoparticle synthesis, separation and/or extraction of components, etc. A specific example of a separation technique for separating mixtures, for example, to be able to analyse them accurately, is chromatography. There is a variety of forms of chromatography such as gas chromatography, gel chromatography, thin-layer chromatography, adsorption chromatography, affinity chromatography, liquid chromatography, etc.

Liquid chromatography is typically used in pharmacy and chemistry, both for analytical and for production applications. In liquid chromatography, use is made of the difference in affinity of different substances with a mobile phase and a stationary phase. Because each substance has its own 'adhesive power' at the stationary phase, they are carried along faster or slower with the mobile phase, thus separating certain substances from others. It is basically applicable to any bond, it has the advantage that no evaporation of the material is necessary and that variations in temperature only have a negligible effect.

A typical example of liquid chromatography is based on chromatographic columns with a basis of one or more channels filled with microfabricated columns. Since their introduction in liquid chromatography, chromatographic columns based on microfabricated columns have proven to be a valuable alternative for systems based on packed bed structures and monolithic systems. Because the microfabricated columns can be applied with a high degree of uniformity and perfectly arranged, the dispersion resulting from differences in flow paths or 'Eddy dispersion' can be almost completely avoided. This principle is more commonly applicable in chemical reactors based on liquid plug propagation.

Furthermore, it is known that the porosity of the channels has a clear effect on the performance for chromatographic applications, for example liquid chromatography applications. This was described, for example, by De Pra et al. in 'Pillar-structured microchannels for onchip liquid chromatography: Evaluation of the permeability and separation performance" in J. Sep. Sci. 2007 (30) 1453-1460, in which it was found that the permeability for the passage through channels increased great with the general porosity of the channels.

It is known to make pillar structures porous, which are provided in columns to, for example, improve chromatography. This dramatically improves the amount of free surface area, while maintaining the ordered structure of the system. In 'Fabrication and Chromatographic Performance of Porous-Shell Pillar-Array Columns' Anal. Chem. 2010 82 (17) 7208-7217, Detobel et al. describe a production technique for making pillar structures with a porous top layer for chip-based liquid chromatography. The production technique is based on a sol-gel process. Starting from a set of silicon-based pillars, a porous silica layer was applied by means of a sol-gel process to the pillars, after which mesopores were created by hydrothermal treatment and treatment with octyldimethylchlorosilane.

However, in order to meet the high demands of chromatography applications, there is a need for column structures with optimal characteristics and good production techniques to produce these column structures.

SUMMARY OF THE INVENTION

It is an object of the embodiments according to the present invention to provide production methods as well as chemical reactors with one or more channels with porous silicon-based micropillar structures with a high permeability for flow through these channels. One specific example of such a chemical reactor is, for example, a chromatographic column with porous, silicon-based pillar structures for separating materials.

It is an advantage of the embodiments of the present invention that efficient systems for separating materials can be produced. It is therefore an advantage of at least some embodiments according to the present invention that the provided systems have a very good separation capacity.

The above object is accomplished by a device and a method according to embodiments of the present invention.

The present invention relates to a method for producing a chemical reactor device based on a fluid flow, the method comprising:
  obtaining a substrate with a fluid channel defined by a channel wall, in which an ordered set of silicon pillar structures is positioned in the fluid channel,
  electrochemically anodising at least the silicon pillar structures to make the silicon pillar structures porous at least to a certain depth,
  after anodising, thermal treatment and functionalisation of the substrate and pillar structures to condition at least a part of the silanol groups on the substrate and/or pillar structures,
  the thermal treatment being carried out at a temperature, with a duration and in an atmosphere so that a possibly formed silicon oxide layer has a thickness of less than 20 nm.

The substrate is preferably a silicon substrate, whether or not doped (such as, for example, doped with boron, nitrogen, phosphor, etc.).

It is an advantage of the present invention that the combination of electrochemical anodisation, thermal treatment and functionalisation results in exceptional pillar structures which unexpectedly ensure a very accurate separation and good permeability in the fluid channel. Moreover, this production method combines the advantages of a good separation with good porosity, which leads to the high permeability as well as the possibility of properly bonding the pillars so that a quality closed reactor is obtained.

The functionalisation can at least partly comprise the conditioning of the silanol groups.

The conditioning may comprise silanising the pillars and/or the wall.

The thermal step and the functionalisation may be adapted in order to, in the chemical reactor in a liquid chromatography assay for a standard mixture of peptides including Angiotensin II with a concentration of peptides of 0.25 ppm introduced into a mixture of a first mobile phase A consisting of 0.05% formic acid and 99.95% water and a second mobile phase B consisting of 0.05% formic acid in ⅕ water and ⅘ ACN at an injection volume of 1 µl, with a flow rate of 1000 nl/min, and under a gradient of 1% to 50% of mobile phase B over a period of 30 minutes, obtain an angiotensin peak in the chromatography with a width of less than 0.2 minutes. The standard mixture is for example an SSP mixture as can be obtained from Sigma.

The thermal treatment may comprise a thermal treatment step having a duration of between 4 hours and 20 hours, for example between 10 hours and 20 hours, for example for 15 hours, at a temperature between 650° C. and 850° C., for example at 750° C. This step can be an oxidation step. This oxidation can be a mild oxidation, i.e. an oxidation in which the formed oxidation layer in the pores and/or on the base substrate, for example a silicon substrate, have a maximum thickness of 20 nm. The thickness is typically measured in the growth direction of the oxidation layer.

The thermal treatment may alternatively or additionally also comprise a rapid thermal step. Such a rapid thermal step may comprise a thermal treatment with a duration of between 5 minutes and 30 minutes, for example for 10 minutes, at a temperature between 700° C. and 900° C., for example 800° C. The short duration of the rapid thermal step can also result in a mild oxidation, i.e. an oxidation in which the formed oxidation layer in the pores and/or on the base substrate, for example a silicon substrate, has a maximum thickness of 20 nm.

In yet another embodiment, the thermal treatment or part thereof can also not be oxidative.

One or more pretreatment steps can be carried out before the thermal treatment. The one or more pretreatment steps may be based on a treatment with an acid. The one or more pretreatment steps may comprise a treatment with $HNO_3$. The pretreatment steps may comprise the following steps:

two treatment steps over a period between 3 minutes and 7 minutes, for example 5 minutes, in $HNO_3$ at a concentration higher than 95%, for example 99%, and one treatment step over a period between 8 minutes and 15 minutes, for example 10 minutes, at a temperature between 85° C. and 105° C., for example at 95° C., in $HNO_3$ at a concentration between 60% and 80%, for example 69%.

The electrochemical anodisation may comprise the following steps:

mounting the substrate in the anodising system adding a solution in which the anodisation takes place, and the application of an electric field for anodising.

The anodising can take place at an induced voltage between 0.1 V and 5 V, for example at 1.2 V, for a period between 1 minute and 60 minutes, for example between 5 minutes and 20 minutes, for example for 10 minutes.

The anodising can take place at an induced current density of between 0.01 mA/cm$^2$ and 100 mA/cm$^2$, for example between 0.1 mA/cm$^2$ and 5 mA/cm$^2$, and for a period between 5 minutes and 60 minutes, for example between 15 minutes and 45 minutes.

The anodisation can be done with decreasing current proportional to time. It is an advantage of the embodiments of the present invention that less current is used as the diameter of the pillars decreases. This results in an optimal introduction of the porosity into the structures.

The solution can contain HF.

The solution may contain water and a surface tension-reducing component such as ethanol or a surfactant.

The present invention also relates to a chemical reactor device based on a fluid flow, the chemical reactor device comprising:

a substrate, for example a silicon-based substrate, with a fluid channel therein defined by a channel wall, an ordered set of silicon pillar structures positioned in the fluid channel, wherein at least the silicon pillar structures are porous to a certain depth and the silanol groups on the pillars are conditioned and any oxide layer on the substrate or pillar structures is no thicker than 20 nm. The thickness is typically measured in the growth direction of the oxidation layer.

The pillar structures may be provided with silanol groups conditioned so as to, in the chemical reactor in a liquid chromatography assay for a standard mixture of peptides including Angiotensin II with a concentration of peptides of 0.25 ppm introduced into a mixture of a first mobile phase A consisting of 0.05% formic acid and 99.95 water and a second mobile phase B consisting of 0.05% formic acid in 1/5 water and 4/5 ACN at an injection volume of 1 μl, with a flow rate of 1000 nl/min, and under a gradient of 1% to 50% of mobile phase B over a period of 30 minutes, obtain an angiotensin peak in the chromatography with a width less than 0.2 minutes.

The inter-pillar distance between the different pillar structures may be less than 10 micrometres, preferably less than 5 micrometres.

The slope of the side walls of the pillar structures can make a slope of less than 2°, preferably less than 1°, such as for instance less than 0.5° with respect to the perpendicular direction of the pillar structures on the plane of the substrate.

The chemical reactor device may be a stand-alone instrument or may be integrated as a component of a lab-on-chip system.

The present invention also relates to a chemical reactor device as described above, integrated into a lab-on-chip system. Consequently, the present invention also relates to a lab-on-chip system comprising a chemical reactor device as described above. The lab-on-chip system may be a chromatographic system, for example a liquid chromatography system, although the present invention is not limited thereto. Alternatively, the chemical reactor device can be a stand-alone device that can be connected to other systems.

The present invention also relates to the use of a chemical reactor device for liquid chromatography applications.

Particular and preferred aspects of the invention are set out in the accompanying independent and dependent claims. Features of the dependent claims may be combined with features of the independent claims and with features of other dependent claims as appropriate and not merely as explicitly set out in the claims.

BRIEF DESCRIPTION OF THE DRAWINGS

FIGS. 1(a) to 1(i) illustrate a schematic overview of various steps in the production process, such as can be used in a production method according to an embodiment of the present invention.

The drawings are only schematic and are non-limiting. In the drawings, the size of some of the elements may be exaggerated and not drawn on scale for illustrative purposes. The dimensions and the relative dimensions do not necessarily correspond to actual reductions of the practical embodiments of the invention. Any reference numbers in the claims shall not be construed as limiting the scope.

DETAILED DESCRIPTION OF ILLUSTRATIVE EMBODIMENTS

Although the present invention will be described with reference to particular embodiments and to certain drawings, the invention is not limited thereto but only by the claims.

It is to be noticed that the term 'having' and 'comprising', as used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression 'a device comprising means A and B' should not be limited to devices consisting only of components A and B. It means that with respect to the present invention, the only relevant components of the device are A and B.

Reference throughout this specification to 'one embodiment' or 'an embodiment' means that a particular feature, structure or characteristic described in connection with the embodiment is included in at least one embodiment of the present invention. Thus, instances of the phrases 'in one embodiment' or 'in an embodiment' in various places throughout this specification may, but do not necessarily, all refer to the same embodiment. Furthermore, the particular features, structures or characteristics may be combined in any suitable manner, as would be apparent to a person of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly named in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those who are skilled in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In a first aspect, the present invention relates to a method for producing a chemical reactor device based on a fluid flow. Such a chemical reactor may be, but is not limited to, a chromatographic column. Other examples of chemical reactors that may benefit from the present inventions are, for example, purification filters or trapping columns, reactors with catalysts (micro or otherwise), multi-phase reactors, fuel cells, electrochemical reactors, capillary electrochromatography reactors, etc.

Embodiments according to the present invention comprise obtaining a substrate with a fluid channel defined by a channel wall, in which an ordered set of silicon pillar structures is positioned in the fluid channel. The method further comprises electrochemically anodising at least the silicon pillar structures to make the silicon pillar structures porous at least to a certain depth. In addition, the method comprises, after anodising, thermal treatment and functionalisation of the substrate and pillar structures to condition at least a part of the silanol groups on the substrate and/or pillar structures, the thermal treatment being carried out at a temperature, with a duration and in an atmosphere such that any silicon oxide layer formed has a thickness of less than 20 nm. It is thereby an advantage of the embodiments of the present invention that good porous structures are obtained which additionally comprise conditioned silanol groups. These characteristics are obtained by the combination of a selected thermal treatment and the functionalisation step.

By way of illustration, embodiments not being limited thereto, an illustrative method for producing a chemical reactor device is illustrated with reference to FIGS. 1(a) to 1(i).

Figure 2:
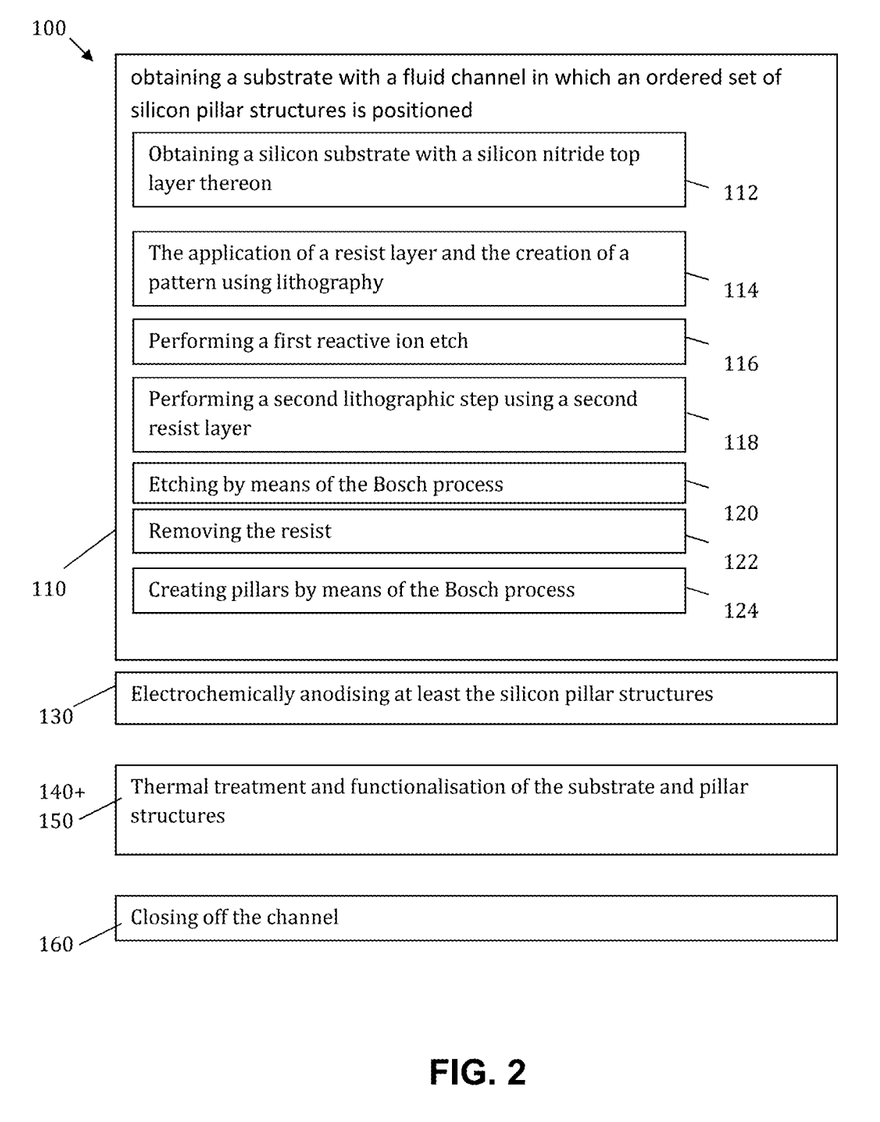
FIG. 2 illustrates a flow chart of a production process according to an embodiment of the present invention.

The method 100 comprises, in a first step, obtaining 110 of a substrate with a fluid channel in which an ordered set of silicon pillar structures is positioned. This step 110 typically comprises a plurality of sub-step s. By way of example, a possible set of sub-step s is illustrated here, although embodiments are not limited thereto. Other sets of sub-step s, as known to those skilled in the art, which also result in a substrate having a fluid channel in which an ordered set of silicon pillar structures is positioned can also be used.

Figures 1A, 1I:
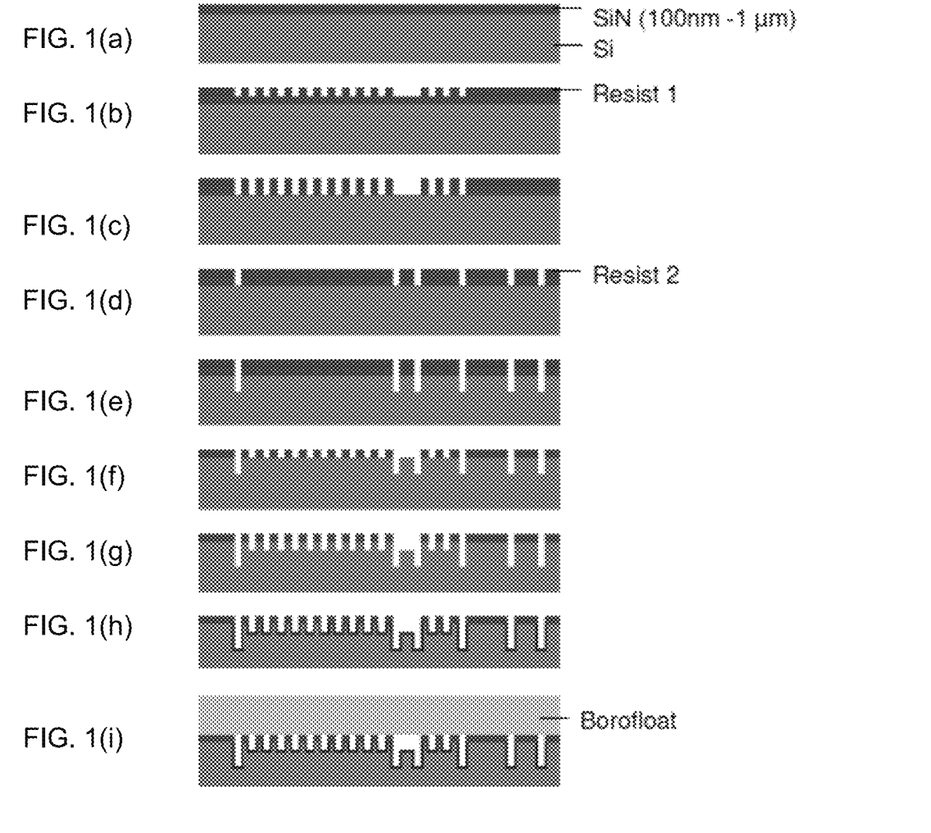

In a first sub-step 112 of an illustrative set of sub-steps, a substrate is obtained, in the present example a silicon substrate having a silicon nitride top layer with a thickness of 100 nm to 1 μm, as shown in FIG. 1(a).

In a first sub-step 114, a resist layer is applied, and a pattern is created by lithography, for example deep UV lithography, as shown in FIG. 1(b).

In a third sub-step 116, a first reactive ion etch is performed on the SiN layer, as illustrated in FIG. 1(c).

In a fourth sub-step 118, a second lithographic step is performed with the aid of a second resist layer, for example using mid-UV lithography which results in μm accuracy, followed by a further reactive ion etch on the SiN layer, as illustrated in FIG. 1(d).

In a fifth sub-step 120, some structures are further etched, for example, by means of the Bosch process, although embodiments are not limited thereto. This is illustrated in FIG. 1(e).

After this, the resist is removed in a sixth sub-step 122 as shown in FIG. 1(f) and pillars are created in a seventh sub-step 124 by means of the Bosch process, as shown in FIG. 1(g). Although the Bosch process is not essential to the invention, it advantageously results in steep walls, which for example produce an angle of inclination between 89° and 91° with respect to the plane of the substrate.

In a second step 130, the method 100 also includes the electrochemical anodisation of at least the silicon pillar structures, as shown in FIG. 1(h) to make the silicon pillar structures porous at least to a certain depth.

In some embodiments, the electrochemical anodisation comprises, for example, mounting the substrate in the anodisation system, adding a solution in which anodisation takes place, and applying an electric field for anodising.

In some embodiments, the electrochemical anodisation is based on the application of a voltage. The induced voltage may for example be between 0.1 V and 5 V, for example 1.2 V. For example, the voltage can be induced for a period between 1 minute and 60 minutes, for example between 5 minutes and 20 minutes, for example for 10 minutes.

In some embodiments, the electrochemical anodisation is based on the application of a current. The induced current density can be, for example, between 0.01 mA/cm$^2$ and 100 mA/cm$^2$, for example between 0.1 mA/cm$^2$ and 5 mA/cm$^2$. For example, the current may be applied for a period between 5 minutes and 60 minutes, for example between 15 minutes and 45 minutes.

The solution used to anodise may, for example, comprise an acid in some embodiments, for example, containing HF. The solution may also contain water and a surface tension-reducing component, such as for example ethanol or a surfactant.

In some embodiments based on an induced current, use is made of a decreasing current proportional to time. This results in good porosity taking into account the reducing diameter of the pillars during the anodising process. In one specific example, use can for example be made of an initial current of 90 mA which is reduced by 1 mA/min to 70 mA (i.e. in 20 minutes). In the present example, the surface available for anodisation is 172.9 cm$^2$. When selecting the current intensity, the surface area of the substrate can be taken into account. Finally, a number of coulombs are sent through the system, whereby, under the right electrochemical and/or chemical conditions, a corresponding quantity of silicon is removed. In some embodiments, the amount of material being removed can be estimated by weighing before and after the anodisation.

Figure 3:
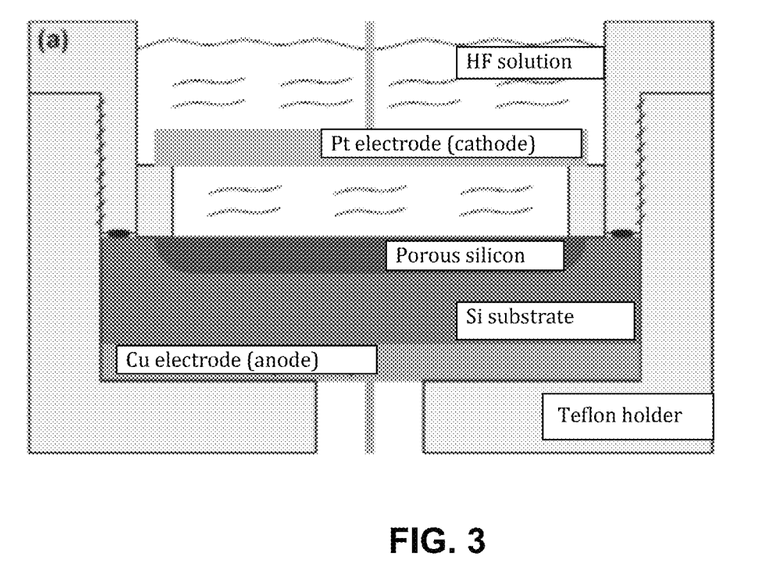
FIG. 3 illustrates an anodisation setup as can be used in a production process according to an embodiment of the present invention.

FIG. 3 illustrates an anodisation system that can be used in a production process according to an embodiment of the present invention.

In a third and fourth step, the method further comprises thermal treatment 140 and functionalisation 150 of the substrate and pillar structures to condition at least a part of the silanol groups on the substrate and/or pillar structures, the thermal treatment being carried out at a temperature, with a duration and in an atmosphere such that any silicon oxide layer formed has a thickness of less than 20 nm. The thermal treatment may be performed prior to the functionalisation, but after the anodisation.

Figure 4:
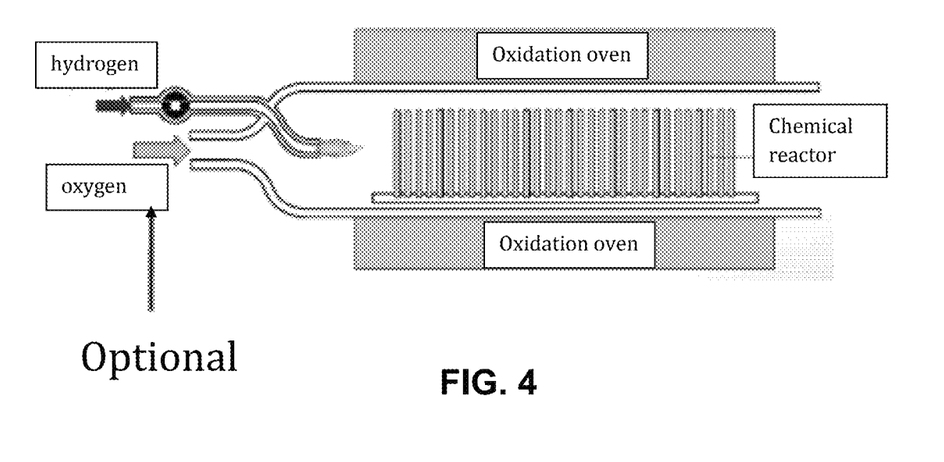
FIG. 4 illustrates an oven for a thermal treatment such as can be used in a production process according to an embodiment of the present invention.

FIG. 4 illustrates an oven as can be used in a thermal treatment from a production process according to an embodiment of the present invention.

The thermal treatment can be carried out with a duration of between 4 hours and 20 hours, for example between 10 hours and 20 hours, for example for 15 hours, and at a temperature between 650° C. and 850° C., for example at 750° C. The thermal treatment can be an oxidation, although embodiments are not limited thereto. The oxidation can be a dry oxidation. The thermal treatment may also comprise a rapid thermal step (as an additional step or separately). The rapid thermal step comprises a treatment with a duration of between 5 minutes and 30 minutes, at a temperature between 700° C. and 900° C., for example 800° C. It can be an oxidative step, although embodiments are not limited thereto.

The functionalisation may comprise silanising the substrate and the pillar structures, for example with C18 silane, although embodiments are not limited thereto.

In a fifth step 160, moreover, the channel is closed by providing a top substrate, as shown in FIG. 1(i). In some embodiments, this can be done by anodically bonding a top substrate to the pillar structure and the substrate. The top substrate may be a glass of substrate such as a borofloat substrate.

In a second aspect, the present invention relates to a chemical reactor device based on a fluid flow. The chemical reactor device comprises a substrate, such as for example a silicon-based substrate, with a fluid channel defined by a channel wall. The device further comprises an ordered set of silicon pillar structures positioned in the fluid channel. The pillar structures are porous to a certain depth. Furthermore, the silanol groups on the pillars are conditioned and any oxide layer is not thicker than 20 nm.

According to some embodiments, the pillar structures are provided with a predetermined number of free silanol groups adapted so as to, in the chemical reactor in a liquid chromatography assay for a standard mixture of peptides including Angiotensin II with a concentration of peptides of 0.25 ppm introduced into a mixture of a first mobile phase A consisting of 0.05% formic acid and 99.95% water and a second mobile phase B consisting of 0.05% formic acid in ⅕ water and ⅘ ACN at an injection volume of 1 µl, with a flow rate of 1000 nl/min, and under a gradient of 1% to 50% of mobile phase B over a period of 30 minutes, obtain an angiotensin peak in the chromatography with a width less than 0.2 minutes.

The features of the channels, and any pillars, may correspond to those known in the prior art. The channels may, for example, have a width between 50 µm and 250 mm, for example between 50 µm and 100 mm, for example between 50 µm and 100 mm, for example between 50 µm and 20 mm. The channels may have a depth between 2 µm and 1 mm, for example between 2 µm and the typical wafer thickness of a silicon wafer. The pillars may have a typical size between 100 nm and 3 mm, for example between 100 nm and 100 µm. The inter-pillar distance between the different pillar structures is preferably less than 10 micrometres, for example less than 5 micrometres. The slope of the side walls of the pillar structures can make a slope smaller than 2°, for example smaller than 1°, such as for example smaller than 0.5°.

In some embodiments, the chemical reactor device is a stand-alone instrument while in other embodiments the chemical reactor device is integrated as a component of a lab-on-chip system.

In a further aspect, the present invention comprises a lab-on-chip system comprising a chemical reactor device as described in the first aspect. The lab-on-chip system may be a chromatographic system, for example a liquid chromatography system, although the present invention is not limited thereto.

In yet another aspect, the present invention comprises the use of a chemical reactor device for liquid chromatography applications, such as, for example, a high-performance liquid chromatography application.

Figure 5:
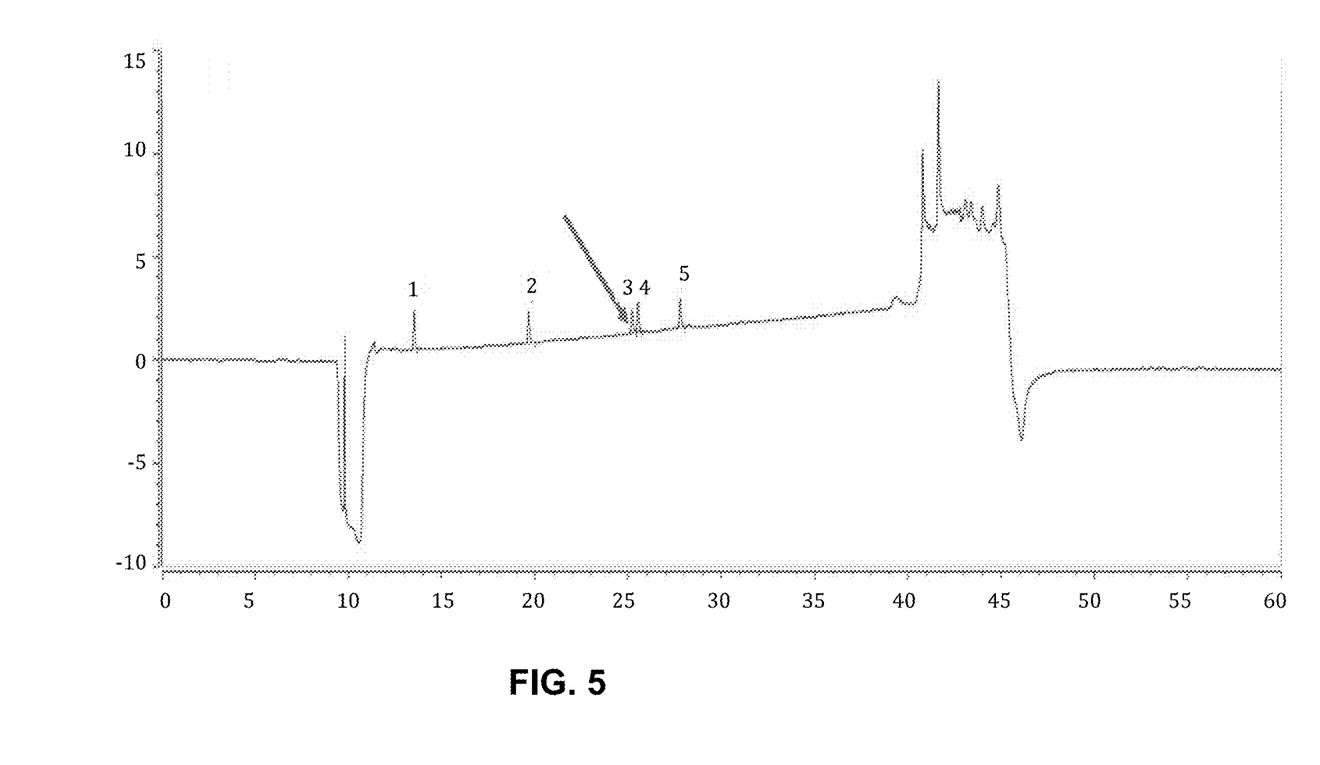
FIG. 5 illustrates a liquid chromatography assay according to an embodiment of the present invention.

By way of illustration, an example is shown of a liquid chromatography assay obtained with a chemical reactor according to an embodiment of the present invention. The assay comprises an analysis of a peptide mixture (containing Angiotensin II) with a 0.25 ppm concentration introduced into a mixture of a mobile phase A and a mobile phase B. The mobile phase A consists of 0.05% formic acid in 99.95% water. The mobile phase B consists of a mixture of 0.05% formic acid in ⅕ water and ⅘ ACN. The injection volume is 1 µl and the flow rate is 1000 nl/min. A gradient of 1 to 50% of mobile phase B was applied over a period of 30 minutes. Additionally, measurements were also taken for 5 minutes at a concentration of 97.5% of phase B, as a washing step.

The results of this assay can be seen in FIG. 5. This illustrates that a narrow angiotensin peak can be seen with a width that is indeed less than 0.2 minutes.

Figure 6:
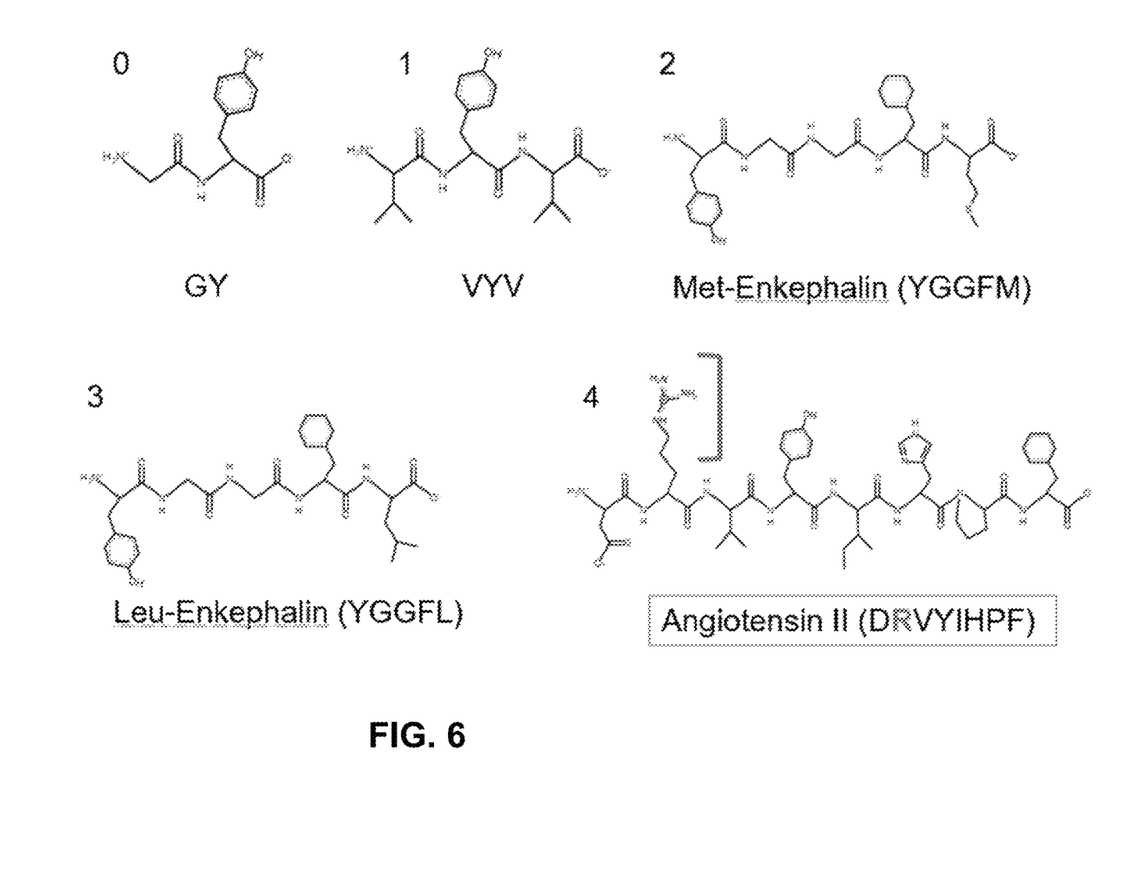
FIG. 6 illustrates peptides as used in an experiment, illustrating features of embodiments of the present invention.
Figure 7:
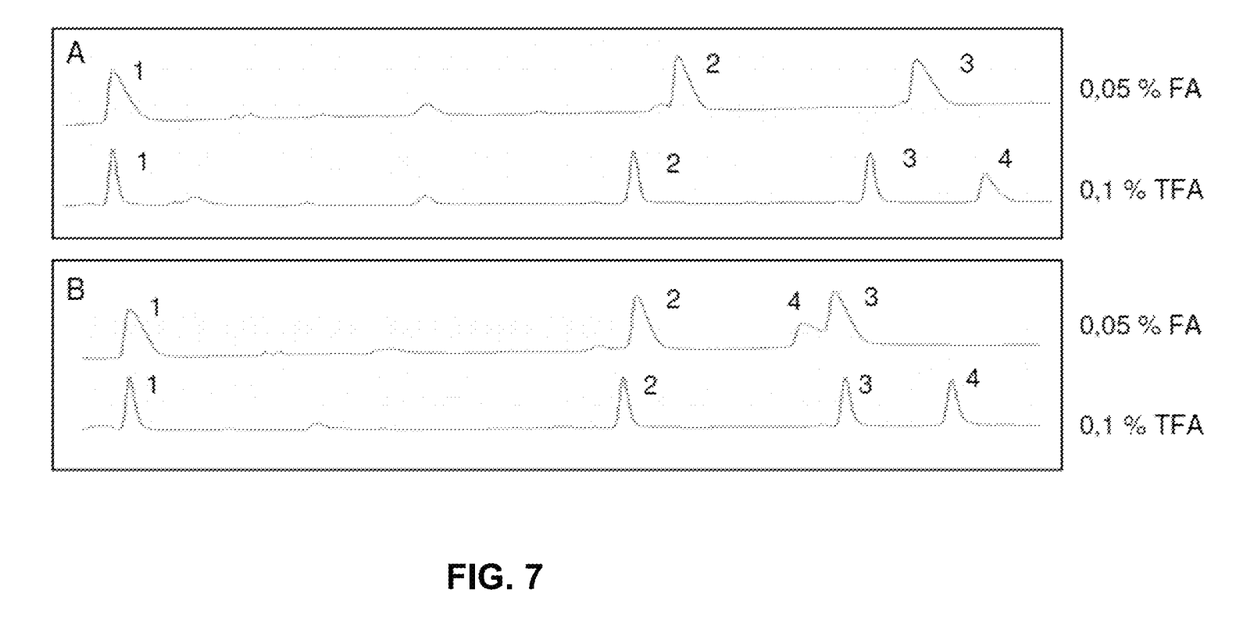
FIG. 7 illustrates chromatography results illustrating advantages of embodiments of the present invention.

Further by way of illustration, chromatographic results are shown for a sample comprising five peptides (of which only 4 are shown). The peptides included are Gly-tyr (not shown), Val-Tyr-Val (1), Leucine-Enkefaline (2), Methionine-Enkefaline (3) en Angiotensine II (4) and are shown in FIG. 6. FIG. 7 shows two chromatograms for separation of a sample. In chromatogram A, separation of the sample in a non-oxidized column is shown, whereas in chromatogram B, separation of the sample in an oxidized column is shown. For both chromatograms, two tests are shown; one whereby the column is modified with formic acid (FA) and one whereby the column is modified with Trifluoracetic acid (TFA). The following chromatographic conditions are applied. Measurements are performed for solvent A being 100% water with the modificator added and for solvent B being a combination of 80% acetonitrile and 20% water with the modificator added. Gradient chromatography was performed with a variation from 1% B to 50% B in 30 minutes.

The different effects of formic acid (FA) and trifluoracetic acid (TFA) for a same column is due to the ion-pairing behavior of TFA. TFA fences off the positive charge (stemming from the amino acide arginine R) on Angiotensine II. In this way, interaction with the deprotoned silanols is prevented. Also, for the other peptides, TFA has a positive effect because it fences off the protoned amino group (specific for 'Tryptic Digests'). TFA also lowers the retention (a faster elution) of some peptides because it makes the peptides more hydrophilic when binding.

The invention claimed is:

1. A method for producing a chemical reactor device based on a fluid flow, the method comprising:
    obtaining a substrate with a fluid channel defined by a channel wall, in which an ordered set of silicon pillar structures is positioned in the fluid channel,
    electrochemically anodising at least the silicon pillar structures to make the silicon pillar structures porous at least to a certain depth,
    after anodising, performing thermal treatment and performing functionalisation of the substrate and pillar structures to condition at least a part of the silanol groups on the substrate and/or pillar structures,
    wherein the thermal treatment is being carried out at a temperature, with a duration and in an atmosphere such that any silicon oxide layer formed has a thickness of less than 20 nm.

2. The method according to claim 1, wherein the functionalisation comprises silanising at least part of the silanol groups on the substrate or the pillar structures.

3. The method according to claim 1, wherein the step of thermal treatment and the functionalisation are adapted to, in a chemical reactor in a liquid chromatography assay for a standard mixture of peptides including Angiotensin II with a concentration of peptides of 0.25 ppm introduced into a mixture of a first mobile phase A consisting of 0.05% formic acid and 99.95% water and a second mobile phase B consisting of 0.05% formic acid in ⅕ water and ⅘ ACN at an injection volume of 1 µl, with a flow rate of 1000 nl/min, and under a gradient of 1% to 50% of mobile phase B over a period of 30 minutes, obtain an angiotensin peak in the chromatography with a width of less than 0.2 minutes.

4. The method according to claim 1, wherein the thermal treatment comprising an oxidation step with a duration of between 4 hours and 20 hours, at a temperature between 650° C. and 850° C.

5. The method according to claim 4, wherein the thermal treatment also comprising a rapid thermal step.

6. The method according to claim 5, wherein the rapid thermal step comprising a treatment with a duration of between 5 minutes and 30 minutes, at a temperature between 700° C. and 900° C.

7. The method according to claim 1, wherein one or more pre-treatment steps being carried out before the thermal treatment.

8. The method according to claim 7,
    the one or more pretreatment steps being based on a treatment with an acid or
    the one or more pretreatment steps comprising a treatment with HNO3, or
    the pretreatment steps comprising:
    two pretreatment steps over a period between 3 minutes and 7 minutes, in HNO3 at a concentration higher than 95%, and
    one pretreatment step over a period between 8 minutes and 15 minutes, at a temperature between 85° C. and 105° C., in HNO3 at a concentration between 60% and 80%.

9. The method according to claim 1, the electrochemical anodising comprising the following steps:
    mounting the substrate in the anodising system,
    adding a solution in which the anodisation takes place, and
    the application of an electrical field for anodising.

10. The method according to claim 9, wherein the anodising taking place at an induced voltage between 0.1 V and 5 V, for a period between 1 minute and 60 minutes.

11. The method according to claim 9, wherein the anodising taking place at an induced current density of between 0.01 mA/cm$^2$ and 100 mA/cm$^2$, and for a period between 5 minutes and 60 minutes.

12. The method according to claim 9, wherein the anodisation taking place with decreasing current density proportional to time.

13. The method according to claim 9, wherein the solution containing HF or the solution containing water and a surface-tension reducing component.

* * * * *